United States Patent [19]

Nelson

[11] 3,754,774

[45] Aug. 28, 1973

[54] VEHICLE AXLE-FRAME LOCK

[76] Inventor: Oscar M. Nelson, 13209 Oval Dr., Whittier, Calif.

[22] Filed: Nov. 18, 1971

[21] Appl. No.: 200,039

[52] U.S. Cl. .......................................... 280/150 G
[51] Int. Cl. ............................................ B60r 27/00
[58] Field of Search ............... 280/150 G; 254/86 R, 254/86 H

[56] References Cited
UNITED STATES PATENTS

| | | | |
|---|---|---|---|
| 2,070,050 | 2/1937 | Hoecker | 280/150 G |
| 1,928,171 | 9/1933 | Dwork | 280/150 G |
| 1,517,648 | 12/1924 | Larson | 280/150 G |

Primary Examiner—Benjamin Hersh
Assistant Examiner—Robert R. Song
Attorney—J. Carroll Baisch

[57] ABSTRACT

There is disclosed an apparatus for locking a vehicle frame and the axle thereof in a relative position, whereby the axle will move together with the frame when manual adjustment of the vehicle is required. The apparatus comprises an adjustable depending bracket attached to the frame, the bracket being provided with an elongated, vertical slot therein to receive a bolt therethrough, the bolt being slidably mounted to a support plate secured to the axle, and the bolt being operably connected to a flexible cable for positioning the bolt in a locked mode of operation.

4 Claims, 5 Drawing Figures

Patented Aug. 28, 1973 3,754,774
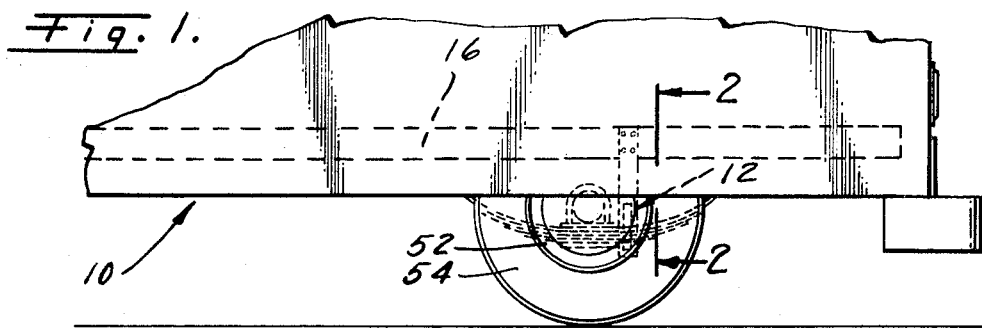
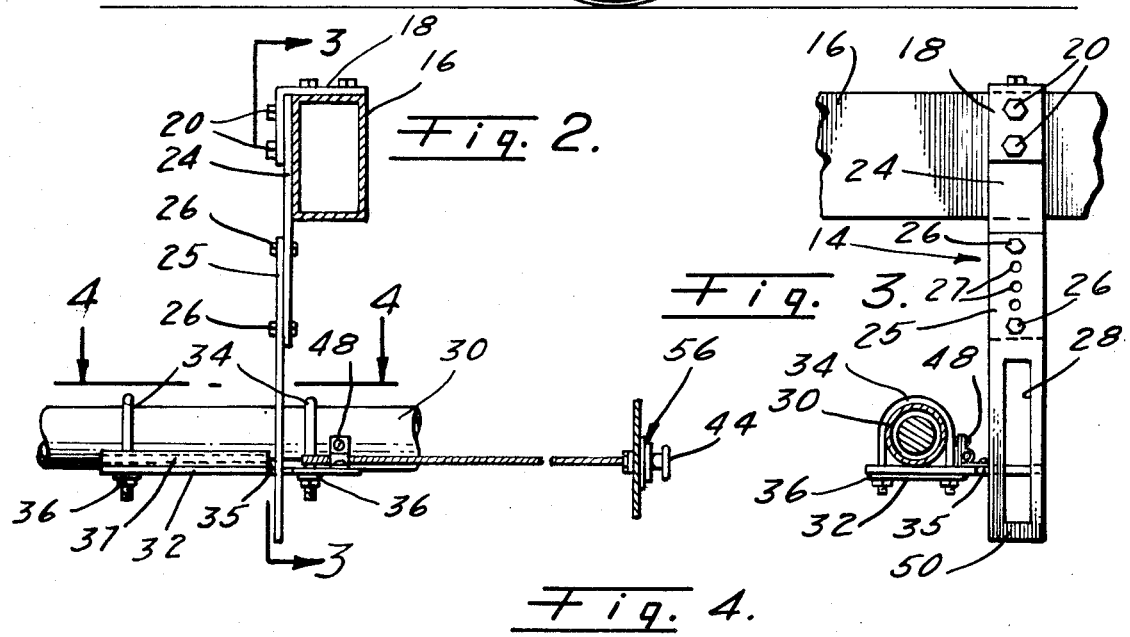
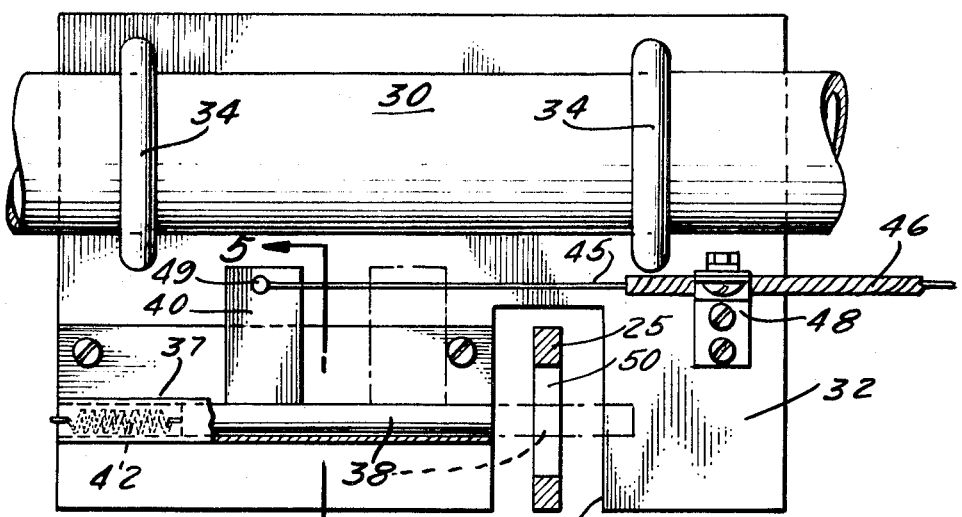
INVENTOR.
Oscar M. Nelson,
BY J. C. Baisch
Attorney 3,754,774

VEHICLE AXLE-FRAME LOCK

BACKGROUND OF THE INVENTION

1. Field of the Invention

This invention relates to an apparatus to facilitate the jacking up of vehicles, but, more particularly, to controlling the distance between the vehicle frame and axle when the vehicle is to be lifted up for repairs.

2. Description of the Prior Art

As is well known in the art, various problems and difficulties have been encountered when vehicles are required to be lifted or jacked up from the ground surface. That is, when the common bumper jack is used the vehicle frame is, first, moved in an upward direction to a point where the springs and shock absorbers are fully extended before the wheel is raised from the ground surface. This, in itself, is a problem because the body of the vehicle is sometimes raised to a very precarious position where one slip could cause damage to the vehicle, as well as injury to the operator. Bumper-type jacks are, therefore, required to be extended at unsafe heights before the wheel of the vehicle is in position to be worked on. Those operating present-day vehicles, such as trailers, automobiles and campers, have found difficulty in handling standard hoisting and lifting devices when making tire and wheel repairs and adjustments, particularly when the vehicle is off the roadway, such as at campgrounds.

To the applicant's knowledge, there is no apparatus on present-day vehicles having the feature of controlling the relative distance a vehicle frame will separate from the axle thereof when the vehicle is raised above the ground surface.

SUMMARY OF THE INVENTION

The present invention discloses an apparatus for manually locking a frame of a vehicle together with the axle thereof, whereby the frame axle and axle can be adjusted to various heights above the ground surface when lifted by a bumper jack. The apparatus comprises an adjustable depending bracket attached to the portion of a vehicle frame above and adjacent to the axle thereof. The vehicle can be of any type, such as an automobile, camper, truck and, more particularly, a trailer. The bracket can be attached to the frame in any suitable manner, depending on the individual vehicle. An elongated slot is disposed in the lower portion of the bracket and is positioned and adapted to receive a spring-loaded bolt which is slidably mounted to a support plate, the support plate being secured to the axle in such a manner that the depending bracket is disposed within a recess of the plate for alignment of the bolt with the slot of the bracket. To operate the bolt, a flexible cable is attached thereto and extended to a convenient area of the vehicle, whereby the operator thereof can have easy access thereto at the same time he operates the lifting jack to raise the vehicle. As the frame is raised, the bolt is brought into contact with the lower bracket end, causing the axle and wheel attached thereto to rise a sufficient distance above the ground, yet the frame of the vehicle not rising to an unsafe and unreasonable degree.

The bolt is held in place by the weight of the wheel and axle and is automatically released as the vehicle is lowered, due to a recoil spring attached between the slidable bolt and plate.

OBJECTS AND ADVANTAGES OF THE INVENTION

The present invention has for an important object a provision whereby a vehicle can be raised for repairs on a wheel, without the vehicle exceeding an unsafe level or position.

It is another object of the present invention to provide a vehicle axle-frame lock apparatus that is capable of jacking up a small house trailer, a light car, a small camper, or any vehicle using rear springs, without raising same to a degree that is not safe.

It is still another object of the invention to provide a vehicle axle-frame lock apparatus which can be mounted to various types of vehicles with the same beneficial results.

It is a further object of the invention to provide an apparatus of this character that is capable of a positive joining of the axle and frame before the raising of the vehicle takes place, and, thereafter, said axle and frame rising off the ground surface together instead of as separate units.

It is still a further object of the invention to provide an apparatus of this character that is easy to install.

Still another object of the invention is to provide an apparatus of this character that is relatively inexpensive to manufacture.

It is still another object of the present invention to provide an apparatus of this character that is simple and rugged in construction.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 1 is a side-elevational view of a house trailer with the present invention installed thereon;

FIG. 2 is a sectional view taken on line 2—2 of FIG. 1 with the invention attached to the frame and axle of said trailer;

FIG. 3 is a cross-sectional view taken on line 3—3 of FIG. 2;

FIG. 4 is a sectional view taken on line 4—4 of FIG. 3, showing the depending bracket in alignment with the slidable bolt member; and FIG. 5 is a cross-sectional view taken on line 5—5 of FIG. 4, illustrating the bolt disposed within the bolt housing.

DESCRIPTION OF THE PREFERRED EMBODIMENT

Referring to the drawings and, more particularly, to FIG. 1, there is illustrated a vehicle represented by a house trailer, indicated generally at 10, having mounted thereon the present invention, as shown in dotted lines and indicated by general reference character 12. The present invention is a locking device having a depending bracket 14 (seen in FIGS. 2 and 3) which is secured to the vehicle's frame 16, the frame thereof being illustrated as a box. However, other vehicles can be adapted with variously-shaped frame members. The bracket 14 is shown as being secured to an angle member 18 by bolts 20, said member 18, in turn, being secured to the box frame 16 by bolts 22. It is contemplated that various means can and will be provided for mounting said bracket to said frame, depending on each individual installation, such as for automobiles, trucks, etc. The depending bracket includes an upper arm 24 and a lower arm 25, said arms being adjustably connected by nuts and bolts 26 which are adapted to be received in openings 27 disposed in each corresponding bracket arm, said lower arm also being provided with an elongated slot 28. Depending on the vehicle and the relationship of the frame 16 to the transverse axle 30, said bracket 14 will vary in its adjustment.

In order to provide the necessary interlocking relationship between the frame and axle, there is provided a support plate 32 mounted to the axle 30 and disposed in such a position that said plate 32 lies just below the frame 16, so that the lower arm 25 projects downwardly between a recess 35 disposed along one edge of said plate 32. The plate 32 is secured to the transverse axle 30 by means of U bolts 34 which fit about said axle and pass through said plate 32, and which are tied together for additional strength by spaced bars 36. It should be noted that the plate 32 is designed to be mounted below the axle, as shown in FIGS. 2, 3 and 4, but, depending on the individual installation, said plate is readily adapted to be positioned on the upper area thereof as well. Thus, the particular vehicle will dictate the proper installation position.

Affixed to one side of said support plate 32 is a housing 37 in which is disposed a slidable bolt or locking pin 38, the bolt being longitudinally movable within a somewhat C-shaped cylinder 39 which is formed along one edge of said bolt housing. Attached to said locking pin 38 is an outwardly-projecting lug member 40 which is permitted to travel within the opening 41 of the C-shaped cylinder 39. A coil spring 42 is attached at one end thereof to the locking pin 38 and at its opposite end to the support plate, causing the pin 38 to be normally in a retracted position, thereby allowing the bracket to freely reciprocate through the recess 35 without restriction thereto, as can be understood by means of the illustrations in FIGS. 2 through 4.

Hence, when the need occurs for making a tire or wheel repair or adjustment, a lifting device (not shown), such as a commonly-used bumper jack, is positioned under the bumper of the vehicle, and as the frame is raised the operator interposes the locking pin 38 through the slot 28 of the lower arm member 25. This is accomplished by pulling lever or knob 44, which is conveniently located at the rear of said vehicle and connected to the lug 39 by a flexible cable 45, said cable being extended through a protective flexible shield conduit 46, the conduit being secured to the support plate by a holding bracket 48 which holds the cable 45 in alignment with lug 39, to which it is movably attached by pin 49. As the bracket 14 rises with the frame 16, the lower cross member 50 of the lower arm 25 engages the locking pin 38 (as seen by phantom lines in FIG. 4), causing the axle and its attached wheel 52 and tire 54 to rise with the frame before the jack is extended to an unsafe position.

After the repair is made the frame is lowered along with the axle, and as said axle reaches its original position the cross member 50 disengages the locking pin 39. At this time, a latching means 56, which holds the cable 45 and pin 38 in an extended position, is released, allowing the spring 42 to retract said pin to an inoperative mode. The latching means can be of any conventional type that will cooperate with the flexible cable 45, said means being positioned adjacent the lever 44.

The invention and its attendant advantages will be understood from the foregoing description and it will be apparent that various changes may be made in the form, construction and arrangement of parts of the invention without departing from the spirit and scope thereof or sacrificing its material advantages, the arrangement hereinbefore described being merely by way of example, and I do not wish to be restricted to the specific forms shown or uses mentioned, except as defined in the accompanying claims.

I claim:

1. An apparatus for locking a vehicle frame and the axle thereof in a relative position, whereby said axle and said frame will move together when said vehicle is raised, said apparatus comprising:
    an adjustable bracket attached to said frame of said vehicle and depending therefrom, said bracket having an elongated, vertical slot disposed in the lower end portion thereof;
    a substantially horizontal support plate mounted to said axle adjacent and below said adjustable bracket;
    a recess disposed along one edge of said plate for reception of said lower end of said bracket;
    a locking means operably supported and affixed to said support plate for operable engagement with said elongated slot of said bracket; and
    remote control operating means connected at one end thereof to said locking means, whereby said locking means is moved into a locked position.

2. An apparatus as recited in claim 1, wherein said apparatus includes a latching means disposed in an operable engagement with said operating means, whereby said operating means is held in a fixed position.

3. An apparatus for locking a vehicle frame and the axle thereof in a relative position, whereby said axle and said frame will move together when said vehicle is raised, said apparatus comprising:
    an adjustable bracket attached to said frame of said vehicle and depending therefrom, said bracket having an elongated, vertical slot disposed in the lower end portion thereof;
    a support plate mounted to said axle adjacent and below said adjustable bracket;
    a recess disposed along one edge of said plate for reception of said lower end of said bracket;
    a locking means operably supported and affixed to said support plate for operable engagement with said elongated slot of said bracket;
    remote control operating means connected at one end thereof to said locking means, whereby said locking means is moved into a locked position, said locking means comprising:
        a housing mounted to said support plate and having a longitudinal slot therein;
        a bolt slidably disposed in said housing for transverse movement across said recess;
        a lug member 40 secured to said bolt and disposed within said longitudinal slot for reciprocating movement therein; and a spring attached to said bolt for biasing said bolt to a normally open position.

4. An apparatus as recited in claim 3, wherein said operating means comprises:

a flexible cable, one end of which is connected to said lug member; and a knob attached to the opposite end of said cable.

* * * * *